US010726850B2

(12) United States Patent
Mossoba et al.

(10) Patent No.: US 10,726,850 B2
(45) Date of Patent: *Jul. 28, 2020

(54) SYSTEMS AND METHODS OF SOUND-BASED FRAUD PROTECTION

(71) Applicant: Capital One Services, LLC, McLean, VA (US)

(72) Inventors: Michael Mossoba, Arlington, VA (US); Joshua Edwards, Philadelphia, PA (US); Sarah Cunningham, Arlington, VA (US); Mark Rothbaum, Shaker Heights, OH (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/460,618

(22) Filed: Jul. 2, 2019

(65) Prior Publication Data

US 2019/0325879 A1    Oct. 24, 2019

Related U.S. Application Data

(63) Continuation of application No. 15/926,034, filed on Mar. 20, 2018, now Pat. No. 10,388,286.

(51) Int. Cl.
| | | |
|---|---|---|
| *G10L 17/06* | (2013.01) | |
| *G10L 17/22* | (2013.01) | |
| *G06Q 30/00* | (2012.01) | |
| *G10L 25/51* | (2013.01) | |
| *G10L 17/00* | (2013.01) | |
| *G06Q 30/02* | (2012.01) | |
| *H04W 12/12* | (2009.01) | |

(52) U.S. Cl.
CPC .......... *G10L 17/22* (2013.01); *G06Q 30/0185* (2013.01); *G10L 17/005* (2013.01); *G10L 17/06* (2013.01); *G10L 25/51* (2013.01); *G06Q 30/0249* (2013.01); *H04W 12/12* (2013.01)

(58) Field of Classification Search
None
See application file for complete search history.

(56) References Cited

U.S. PATENT DOCUMENTS

| | | | | |
|---|---|---|---|---|
| 6,144,938 | A * | 11/2000 | Surace | G10L 13/033 704/257 |
| 6,614,781 | B1 * | 9/2003 | Elliott | H04L 29/06027 370/352 |
| 6,757,362 | B1 * | 6/2004 | Cooper | H04M 3/527 379/88.01 |
| 7,299,177 | B2 | 11/2007 | Broman et al. | |
| 7,386,105 | B2 * | 6/2008 | Wasserblat | G06Q 20/4016 379/114.14 |

(Continued)

*Primary Examiner* — Neeraj Sharma
(74) *Attorney, Agent, or Firm* — DLA Piper LLP (57) ABSTRACT

The present disclosure describes systems and methods of fraud protection. A listening device may monitor ambient sound and detect one or more triggering sound patterns. The listening device may record the one or more triggering sound patterns and record a person's voice, and send the recordings to a server, wherein the server is configured to calculate a confidence level of fraud based on the one or more triggering sound patterns and the recording of the person's voice using a speech pattern model of the person, and to output an alert if the confidence level of fraud is greater than a threshold value.

20 Claims, 7 Drawing Sheets

(56) References Cited

U.S. PATENT DOCUMENTS

| | | |
|---|---|---|
| 7,512,221 B2 | 3/2009 | Toms |
| 9,099,088 B2 | 8/2015 | Washio |
| 9,210,183 B2 | 12/2015 | Sadovsky |
| 9,842,330 B1* | 12/2017 | Van Os ................ G06Q 20/327 |
| 9,930,189 B2 | 3/2018 | Chauhan |
| 9,953,321 B2 | 4/2018 | Zoldi |
| 2005/0033582 A1* | 2/2005 | Gadd ..................... G06Q 30/02 |
| | | 704/277 |
| 2007/0250920 A1 | 10/2007 | Lindsay |
| 2008/0255842 A1* | 10/2008 | Simhi .................... G10L 25/78 |
| | | 704/246 |
| 2010/0250364 A1* | 9/2010 | Song ...................... G06F 21/33 |
| | | 705/14.47 |
| 2012/0072453 A1 | 3/2012 | Guerra et al. |
| 2013/0276125 A1* | 10/2013 | Bailey ..................... G06F 21/46 |
| | | 726/25 |
| 2014/0058854 A1 | 2/2014 | Ranganath |
| 2015/0055763 A1 | 2/2015 | Guerra et al. |
| 2015/0269941 A1* | 9/2015 | Jones ...................... G10L 17/22 |
| | | 704/273 |
| 2016/0125522 A1* | 5/2016 | Tang ...................... G06Q 40/00 |
| | | 705/35 |
| 2016/0196615 A1 | 7/2016 | Yen |
| 2017/0225336 A1 | 8/2017 | Deyle |
| 2017/0316415 A1 | 11/2017 | Gonzalez |
| 2017/0339277 A1* | 11/2017 | Lewinson ......... H04M 3/53341 |
| 2018/0007087 A1* | 1/2018 | Grady ................... H04L 63/101 |
| 2018/0253718 A1 | 9/2018 | Khan |
| 2018/0302416 A1* | 10/2018 | Einberg ................ H04W 12/04 |
| 2019/0207975 A1* | 7/2019 | Wardman ............. H04L 51/046 |

* cited by examiner

SYSTEMS AND METHODS OF SOUND-BASED FRAUD PROTECTION

CROSS-REFERENCE TO RELATED APPLICATION INFORMATION

This is a continuation of U.S. patent application Ser. No. 15/926,034, filed Mar. 20, 2018, the entirety of which is incorporated herein by reference.

FIELD

The present disclosure generally relates to fraud protection technology.

BACKGROUND

Because of the fast development of information technology, financial transactions may take place with high-efficiency at any time in any place. However, this technology advancement has also been exploited for fraudulent purposes. Senior people are particularly vulnerable because they are believed to own more assets and be more polite and trusting to strangers. They are also less likely to report a fraud for various reasons. Thus, they are at a high risk of being victims of scams and frauds. There is a need for a system and a method of fraud protection.

SUMMARY

In one aspect, the present disclosure describes a computer-implemented method of fraud protection. The method may include: monitoring, by a listening device, ambient sound; detecting one or more triggering sound patterns from the ambient sound; recording the one or more triggering sound patterns; recording, by the listening device, a person's voice for a first time duration, in response to detecting the one or more triggering sound patterns; and sending the recorded one or more triggering sound patterns and the recording of the person's voice to a server, wherein the server is configured to calculate a confidence level of fraud based on the one or more triggering sound patterns and the recording of the person's voice using a speech pattern model of the person, and to output an alert if the confidence level of fraud is greater than a threshold value.

In some embodiments, the one or more triggering sound patterns may include at least one of "IRS," "owe," "money," "debt," "wire," "IRA," "investment," "may be at risk," "retirement," "back taxes," "act now," "before it's too late," "time is running out," "failure to act," "once in a lifetime," "you've won," "last chance," "arrest," or "pay."

In some embodiments, the one or more triggering sound patterns may include at least one of a doorbell sound, a door knock sound, a phone ring, a voicemail, or a TV sound clip. In some embodiments, the first time duration may be between 0.1 and 300 seconds.

In some embodiments, the method may include: receiving, by the listening device, the alert from the server; and outputting a notification in response to receiving the alert. In some embodiments, the method may include: detecting one or more triggering words in the person's voice; and replacing the first time duration with a second time duration.

In another aspect, the present disclosure describes a computer-implemented method of fraud protection. In some embodiments, the method may include: receiving, by a server, one or more speech samples associated with a person; generating a speech pattern model of the person based on the one or more speech samples; storing the speech pattern model of the person; receiving one or more triggering sound patterns and a recording of the person's voice obtained by a listening device; establishing a correlation between the one or more triggering sound patterns and the recording of the person's voice; determining a speech pattern based on the recording of the person's voice; comparing the speech pattern to the speech pattern model of the person; and determining a confidence level of fraud based on the correlation between the one or more triggering sound patterns and the recording of the person's voice and the comparison between the person's speech pattern and the person's speech pattern model.

In some embodiments, the one or more triggering sound patterns may include at least one of a doorbell sound, a door knock sound, a phone ring, a voicemail, or a TV sound clip.

In some embodiments, the method may include: sending an alert to a pre-determined entity associated with the person if the confidence level of fraud is greater than a first threshold value. In some embodiments, the pre-determined entity may include at least one of a financial institution, a law enforcement agency, a family member of the person, or a caregiver associated with the person.

In some embodiments, the method may include: updating a flag status of an account associated with the person if the confidence level of fraud exceeds a second threshold value; and outputting the flag status of the account in a user interface. In some embodiments, the account associated with the person may include at least one of a bank account, a checking account, a saving account, a credit card account, an investment account, a loan account, or an individual retirement account. In some embodiments, the method may include freezing an account associated with the person if the confidence level of fraud is greater than a third threshold value.

In another aspect, the present disclosure describes a system of fraud protection. The system may include: one or more microphones configured to monitor ambient sound and detect one or more triggering sound patterns from the ambient sound, and a processor circuit coupled to the one or more microphones and configured to execute instructions causing the processor to: record the one or more triggering sound patterns; record a person's voice for a first time duration, in response to detecting the one or more triggering sound patterns; and send the recorded one or more triggering sound pattern and the recording of the person's voice to a server, wherein the server is configured to calculate a confidence level of fraud based on the one or more triggering sound patterns and the recording of the person's voice using a speech pattern model of the person.

In some embodiments, the system may include a speaker coupled to the processor circuit and configured to play an audio file in response to the confidence level of fraud exceeding a threshold value.

BRIEF DESCRIPTION OF THE DRAWINGS

To assist those of skill in the art, reference is made to the accompanying figures. The accompanying figures, which are incorporated in and constitute a part of this specification, illustrate one or more embodiments of the invention and, together with the description, help to explain the invention. Illustrative embodiments are shown by way of example in the accompanying drawings and should not be considered as limiting.

DETAILED DESCRIPTION

Because of the fast development of information technology, financial transactions may take place with high-efficiency at any time in any place. However, this technology advancement has also been exploited for fraudulent purposes. Senior people are particularly vulnerable because they are believed to own more assets and to be more polite and trusting to strangers. They are also less likely to report a fraud for various reasons. Thus, they are at a high risk of being victims of scams and frauds. Common types of fraud may include frauds by mail or email, frauds by phone, or frauds by advertisements on TV.

The popularity of ambient listening devices or home assistant devices has increased dramatically recently. These types of the devices are designed to listen to a user's voice instructions and provide the user with information such as weather, traffic, online shopping, communication, etc. The present disclosure describes systems and methods to protect a user from a potential fraud with a listening device. A listening device may be used to monitor ambient sound and record a person's voice in response to a triggering sound. The recording may be analyzed by a server and compared to the person's normal speech pattern or speech pattern model. If it is determined a confidence level of fraud or potential fraud or attempts at fraud is high, the system may send an alert. The alert may be sent to a pre-determined entity such as a financial institution, a law enforcement agency, a family member, or a caregiver. The system may also place a flag on the person's account with a financial institution which may trigger further review and verification.

Figure 1:
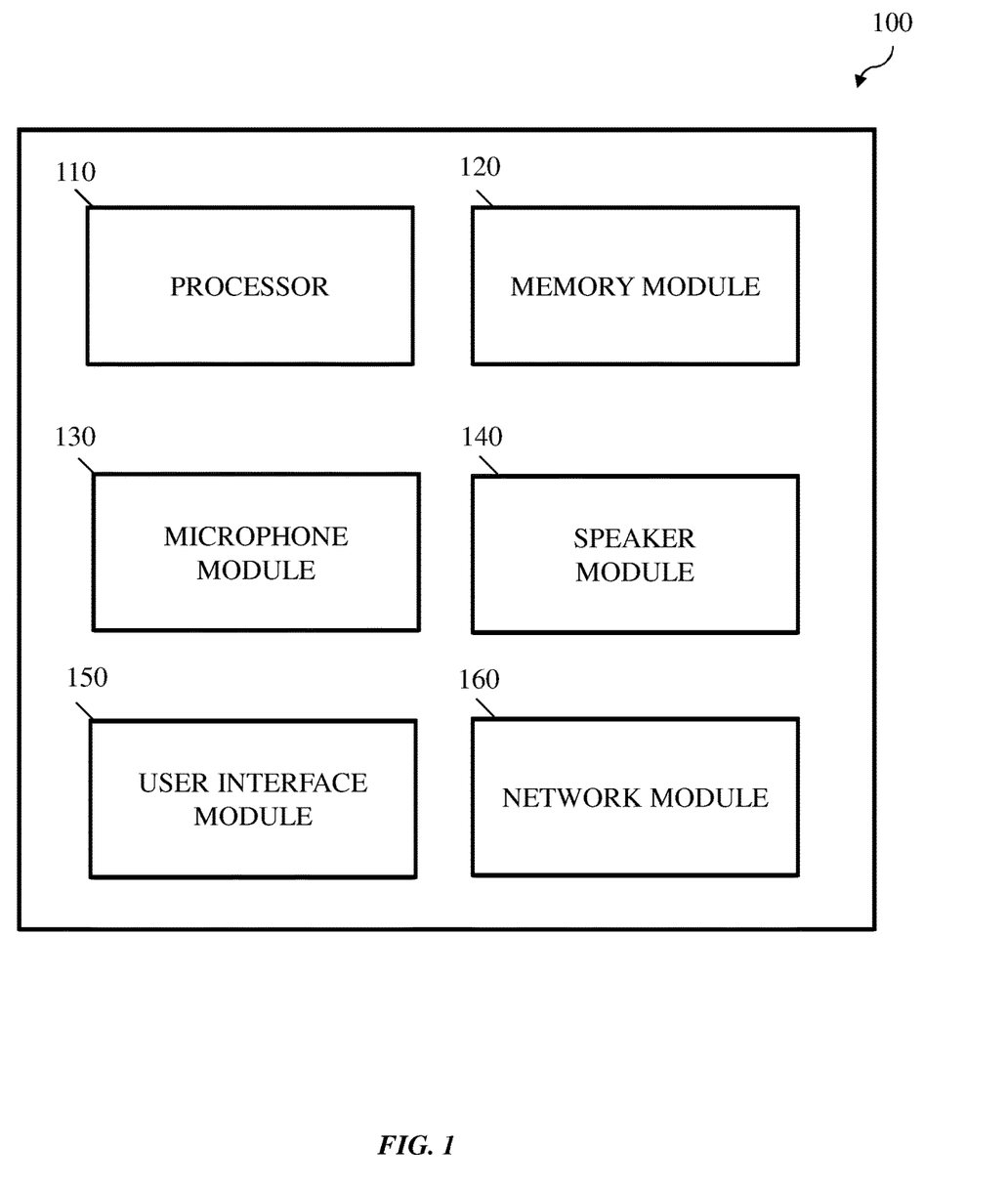
FIG. 1 is a block diagram showing different modules within a listening device, according to some embodiments of the present disclosure.

FIG. 1 is a block diagram showing a listening device 100, according to some embodiments of the present disclosure. In some embodiments, the listening device 100 may include a processor 110, a memory module 120, a microphone module 130, a speaker module 140, a user interface module 150, and a network module 160.

The listening device 100 may include a configurable and/or programmable processor 110 and, and optionally, one or more additional configurable and/or programmable processor(s) 110 (for example, in the case of systems having multiple processors), for executing computer-readable and computer-executable instructions or software stored in the memory module 120 and other programs for controlling system hardware. In some embodiments, the processor 110 may include a general purpose computer processor. In some embodiments, the processor 110 may include a low-power processor designed for mobile devices. In some embodiments, the processor 110 may include other types of processors, or a combination thereof.

The memory module 120 may include a computer system memory or random access memory, such as DRAM, SRAM, EDO RAM, and the like. The memory module 120 may include other types of memory as well, or combinations thereof.

The microphone module 130 may include one or more microphones. In some embodiments, the microphone module 130 may include a microphone array with any number of microphones operating in tandem. In some embodiments, the microphone module 130 may be configured to operate continuously to pick up voice or sound input from the environment.

The speaker module 140 may include one or more speakers. In some embodiments, the speaker module 140 may be configured to play an audio file for the user, such as a song, a podcast, etc. In some embodiments, the speaker module 140 may be configured to play a pre-recorded voice for the user, such as a voicemail. In some embodiments, the speaker module 140 may be configured to play a synthesized voice for the user, such as a synthesized human speech.

The user interface module 150 may include different forms of user interface depending on specific needs of different embodiments. In some embodiments, the user interface module 150 may include one or more displays, such as a liquid crystal display (LCD), to show device status and information to a user. In some embodiments, the user interface module 150 may include one or more touch screens to receive a user's input. In some embodiments, the user interface module 150 may include one or more buttons to receive a user's input.

The network module 160 may include different components depending on specific needs of different embodiments. In some embodiment, the network module 160 may include one or more local area network (LAN) interfaces. In one embodiment, the network module 160 may include one or more wide area network (WAN) interfaces. In some embodiments, the network module 160 may include one or more cellular communication interfaces, such as a 4G Long-Term Evolution (LTE) interface. In some embodiments, the network module 160 may include a Wi-Fi interface configured to connect and communicate with a Wi-Fi network. In some embodiments, the network module 160 may include a Bluetooth® interface. In some embodiments, the network module 160 may include other types of communication components as well, or combinations thereof.

In some embodiments, the listening device 100 may be configured to operate continuously to monitor ambient sound. For example, the listening device 100 may be configured to be "always on" and not require specific keywords to activate.

Figure 2:
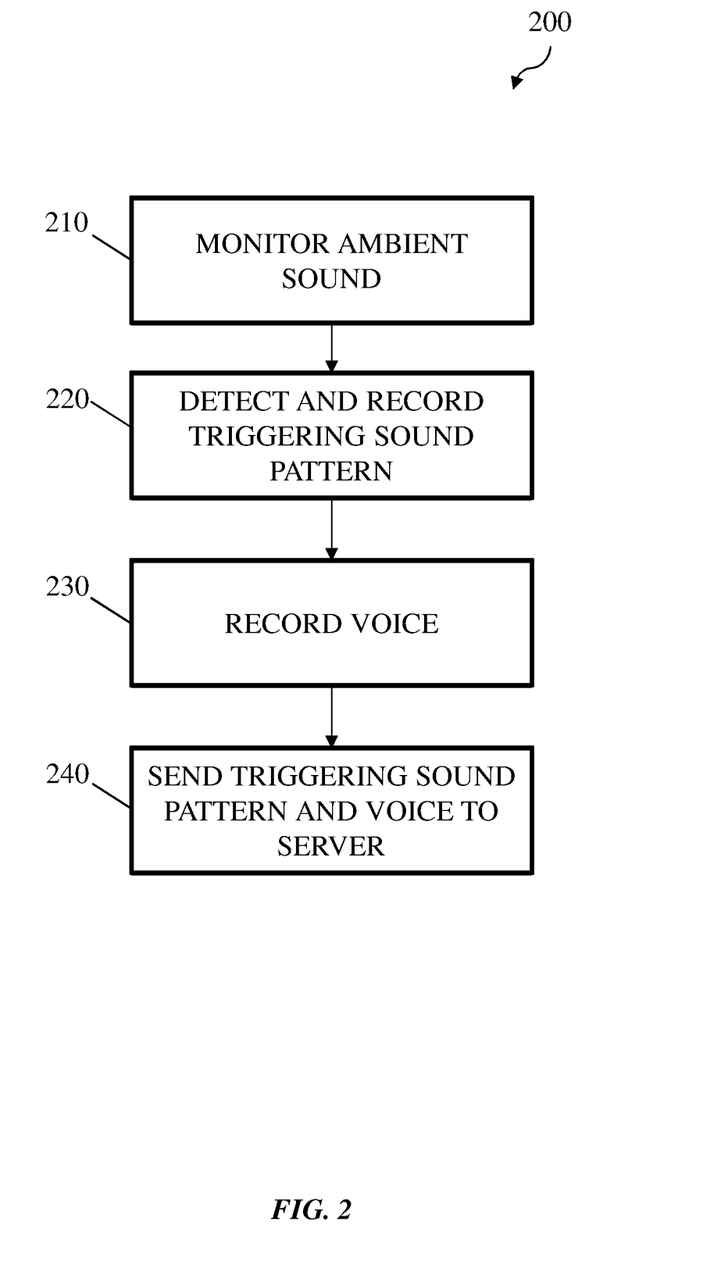
FIG. 2 is a flowchart showing a method of fraud protection with a listening device, according to some embodiments of the present disclosure.

FIG. 2 is a flowchart showing a method of fraud protection with a listening device, according to some embodiments of the present disclosure. At step 210, the listening device 100 may be configured to operate continuously to monitor ambient sound with the microphone module 130. As discussed above, in some embodiments, the listening device 100 may be configured to be "always on" and not require specific keywords to activate.

At step 220, the listening device 100 may be configured to detect one or more triggering sound patterns with the microphone module 130. In some embodiments, the triggering sound pattern may be a doorbell sound, a door knock sound, a phone ring, a voicemail being played, or a TV sound clip such as a TV commercial. In some embodiments, the triggering sound pattern may be the sound of a certain word, such as "IRS," "owe," "money," "debt," "wire," "IRA," "investment," "may be at risk," "retirement," "back taxes," "act now," "before it's too late," "time is running out," "failure to act," "once in a lifetime," "you've won," "last chance," "arrest," "pay," etc. In some embodiments, the triggering sound pattern may include other sounds which may be related to a potential fraud. Within step 220, the listening device 100 may be configured to record the triggering sound pattern for later analysis. The recorded triggering sound pattern may be used to establish a correlation with a user's speech.

At step 230, after a triggering sound pattern is detected, the listening device 100 may be configured to record the ensuing speech of the user. For example, after the listening device 100 detects and records a triggering sound pattern "IRS", it may be configured to start recording the user's voice with the microphone module 130. The user might be involved in a conversation and say "How much tax do I owe?", or "How should I pay?" The listening device 100 may be configured to record the user's voice for a pre-determined duration of time. In some embodiments, the pre-determined duration of time may be between 0.1 and 300 seconds. In some embodiments, the pre-determined duration of time may be between 0.1 and 1800 seconds. In some embodiments, the pre-determined duration of time may be extended if the listening device 100 hears certain triggering words in the user's voice. For example, a default recording time may be 30 seconds. But if the user says "how should I pay," the listening device 100 may extend the recording time (e.g., 100 seconds). In some embodiments, the secondary triggering words may be the same as the initial triggering sound pattern, such as "IRS." In some embodiments, they may be different. The listening device 100 may be configured to save the recording into one or more audio files. In some embodiments, the one or more audio files may include additional recording from a pre-set period of time prior to the triggering sound pattern. In some embodiments, the pre-set period of time for the additional recording may be between 0.1 and 30 seconds. The additional recording may be helpful for investigation and provide context information related to the trigger sound pattern.

In another embodiment, the triggering sound pattern may be a voicemail alert. The detection of the voicemail may trigger the listening device to start recording. The listening device may be configured to first record the playback of the voicemail and then record the user's response. The user may be silent and does not have any response to the voicemail. Or the user may initiate a phone call. The listening device 100 may be configured to record for a pre-determined duration of time. In some embodiments, the pre-determined duration of time may be between 0.1 and 300 seconds. In some embodiments, the pre-determined duration of time may be between 0.1 and 1800 seconds. In some embodiments, the pre-determined duration of time may be extended if the listening device 100 hears certain triggering words in the user's voice. For example, a default duration of time may be 30 seconds. But if the user says "how should I pay," the listening device 100 may be configured to extend the recording time (e.g., 100 seconds). In some embodiments, the listening device 100 may be configured to keep recording until a silence lasts for a pre-defined period of time. In some embodiments, the pre-defined period of time of silence may be between 10 and 300 seconds.

In another embodiment, the triggering sound pattern may be a doorbell sound. The detection of the doorbell sound may trigger the listening device 100 to start recording. The listening device 100 may be configured to first record the voice of the person at the door, such as a salesperson, a visitor, etc. Then the listening device 100 may be configured to record the voice of the user. The listening device 100 may be configured to record for a pre-determined duration of time. In some embodiments, the pre-determined duration of time may be between 0.1 and 300 seconds. In some embodiments, the pre-determined duration of time may be between 0.1 and 1800 seconds. In some embodiments, the listening device 100 may be configured to keep recording until a silence lasts for a pre-defined period of time. In some embodiments, the pre-defined period of time of silence may be between 10 and 300 seconds.

In some embodiments, different triggering sound patterns may correspond to different periods of recording time. For example, a doorbell sound may trigger the listening device 100 to record for a relatively long period of time (e.g., 200 seconds) since it may take longer for the user to get to the door and start engaging with the person at the door. In another example, if the triggering sound pattern is a voicemail, the recording time may be relatively short (e.g., 100 seconds).

At step 240, the listening device 100 may be configured to send the recorded triggering sound pattern and the voice of the user to a server for analysis. The listening device 100 may be configured to communicate with the server through the network module 160 shown in FIG. 1. In some embodiments, the listening device 100 may be configured to transmit the saved audio file in its original file format. In some embodiments, the listening device 100 may be configured to compress the saved audio file or convert the saved audio file into another file format to reduce the data transmission time. In some embodiments, in the absence of any triggering sound pattern, the listening device may be configured to perform its normal utility function (i.e., providing information such as weather, traffic, etc.) and transmit the user's voices or voice instructions to a designated information server to process. In some embodiments, in response to a detection of triggering sound pattern, the listening device may be configured to perform its fraud protection function and transmit the recordings to a designated fraud protection server to process. In some embodiments, the listening device may be configured to send all the recordings to the same server or servers to process.

In some embodiments, the server may be configured to analyze the recordings and determine a confidence level of fraud or potentially fraudulent attempts. If the confidence level of fraud is above a certain threshold, the server may be configured to send an alert to the listening device 100. In some embodiments, the threshold may be between 40% and 100%. For example, the threshold may be set to 50% and the server may be configured to send out an alert if the confidence level of fraud exceeds 50%. In some embodiments, the listening device 100 may include the speaker module 140 and the speaker module 140 may be configured to play an audio file in response to the received alert.

Figure 3:
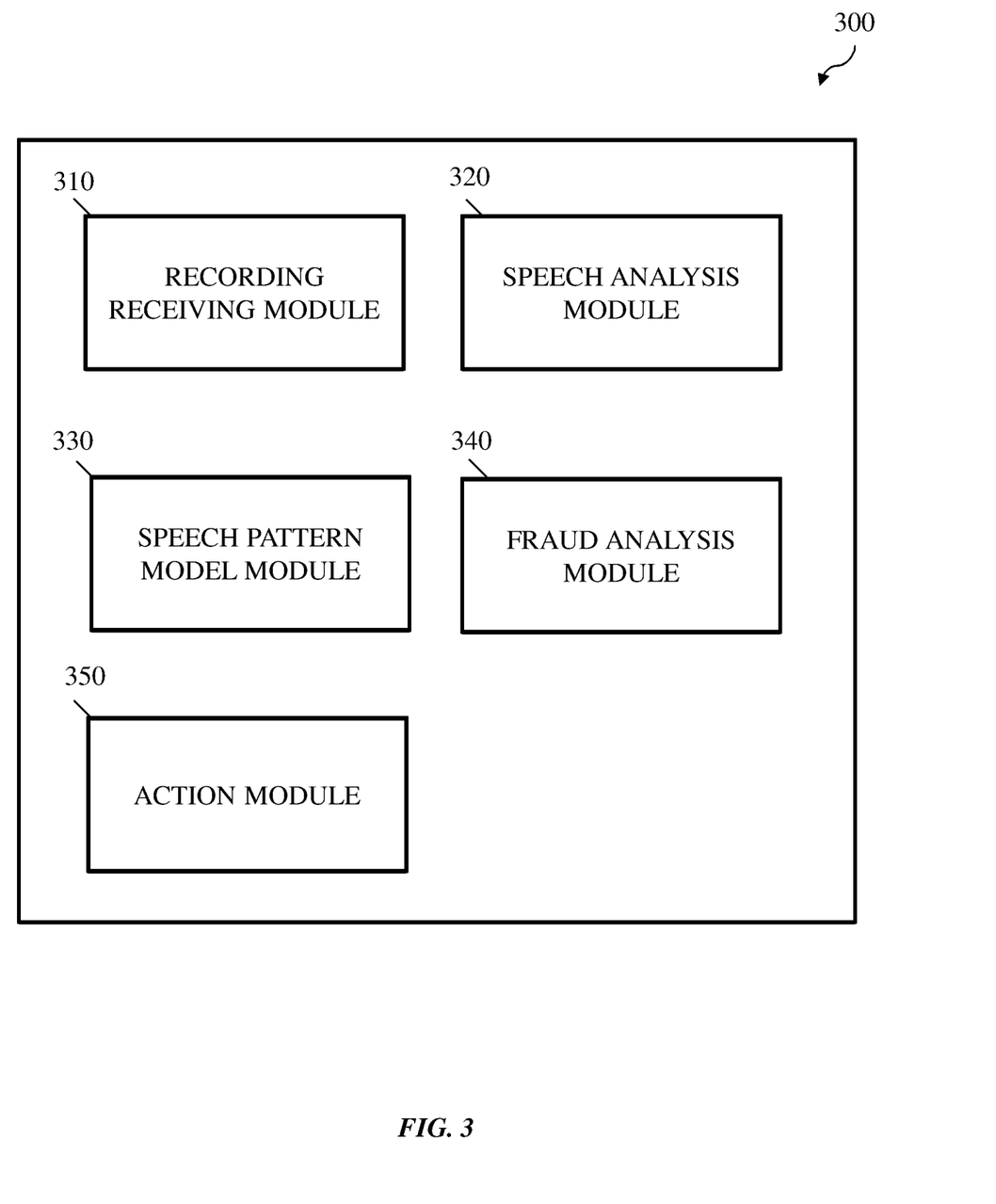
FIG. 3 is a block diagram showing different modules within a server, according to some embodiments of the present disclosure.

FIG. 3 is a block diagram showing different modules within a server 300, according to some embodiments of the present disclosure. For example, the server 300 may include a recording receiving module 310, a speech analysis module 320, a speech pattern model module 330, a fraud analysis module 340, and an action module 350.

The recording receiving module 310 may be configured to receive one or more recordings from a listening device via the Internet. In some embodiments, the one or more recordings may include voice samples of a user. These voice samples may be used to generate a speech pattern model of the user which reflects how the user usually talks. In some embodiments, the one or more recordings may include a triggering sound pattern. The triggering sound pattern may be analyzed to determine a correlation with the user's speech. In some embodiments, the one or more recordings may include recorded voices of a user following a triggering sound pattern.

The speech analysis module 320 may be configured to extract a user's speech from the received recordings. In some embodiments, the speech analysis module 320 may be configured to remove ambient noise from the recordings. In some embodiments, the speech analysis module 320 may be configured to isolate and extract the user's speech from a multi-party conversation.

The speech pattern model module 330 may be configured to generate a user's speech pattern model based on one or more received voice samples. In some embodiments, the speech pattern model may include one or more characteristics of the user's usual speech, such as tempo, tone, volume, pattern using speech sounds, static phrases, etc.

The fraud analysis module 340 may be configured to determine a confidence level of fraud based on the received recordings. In some embodiments, the fraud analysis module 340 may be configured to determine whether or not a correlation exists between the triggering sound pattern and the user's ensuing speech. In some embodiments, the fraud analysis module may be configured to compare the user's speech pattern with a user's speech pattern model. For example, if the user's speech is a direct response to a triggering sound pattern and deviates from the user's speech pattern model (e.g. based on a deviation exceeding a threshold), the fraud analysis module 340 may be configured to determine a relatively high confidence level of fraud. A substantial change in a user's sentiment can be a sign of potential fraud, particularly when the user is anxious, nervous, or surprised. In some embodiments, the fraud analysis module 340 may be configured to perform a sentiment analysis on the received recordings to determine an attitude or an emotional reaction of the user to the triggering sound pattern and calculate a confidence level of the fraud based on the evaluation result of the sentiment analysis.

The action module 350 may be configured to perform a pre-defined action based on the confidence level of fraud. In some embodiments, the pre-defined action may be related to a user's account. For example, the pre-defined action may include placing a flag on a user's account for further review, or even freezing the user's account. In some embodiments, the flag may be placed for certain types of transactions that may correspond to the type of fraud identified in the speech. In some embodiments, the pre-defined action may include sending out a notification. For example, the action module 350 may be configured to send an alert to a pre-determined entity, such as a law enforcement agency, a financial institution, a caregiver, a family member, etc. In another example, the action module 350 may be configured to send an alert to the listening device 100.

Figure 4:
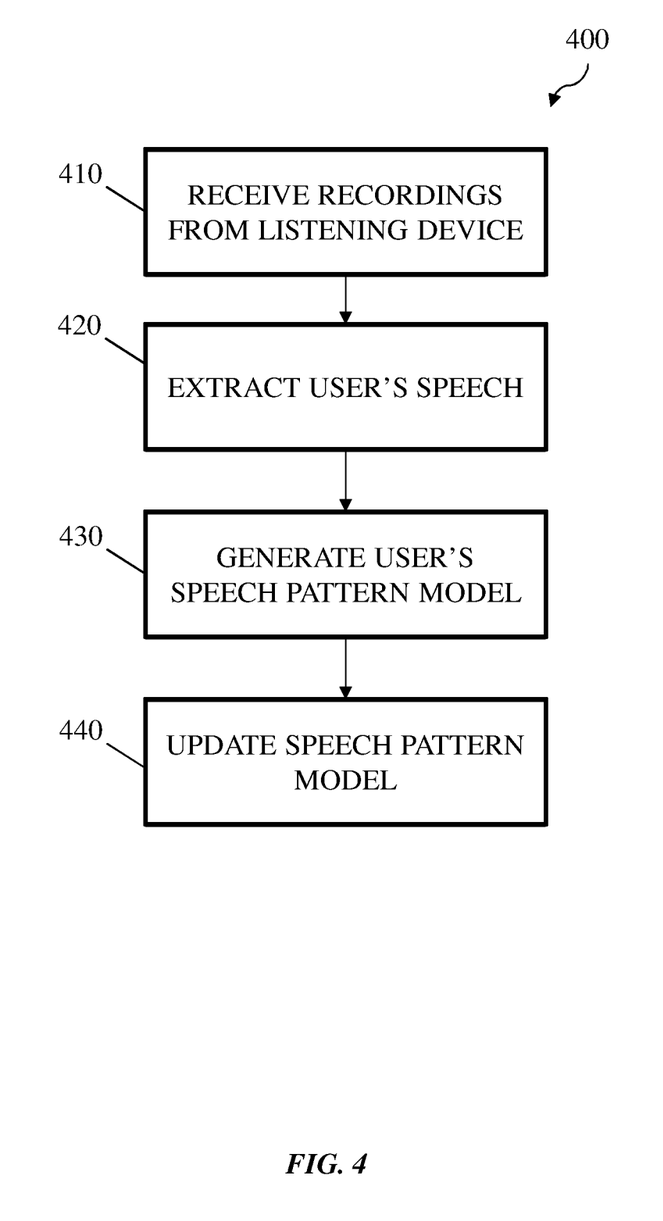
FIG. 4 is a flowchart showing a method of generating a user's speech pattern model, according to some embodiments of the present disclosure.

FIG. 4 is a flowchart showing a method 400 of generating a user's speech pattern model, according to some embodiments of the present disclosure. At step 410, the recording receiving module 310 may be configured to receive one or more recorded voice samples of the user from the listening device. In some embodiments, the listening device 100 may be configured to record a number of voice samples of the user during the day and send the recordings to the server during the night. In some embodiments, the voice samples may include the user's voices in difference contexts, such as an in-person conversation, a phone call, etc. The recordings of voice samples may also include samples from any other contexts.

At step 420, the speech analysis module 320 may be configured to extract the user's speech from the received voice samples. In some embodiments, the speech analysis module 320 may be configured to remove ambient noise from the recordings. In some embodiments, the speech analysis module 320 may be configured to isolate and extract the user's speech from a multi-party conversation.

At step 430, the speech pattern model module 330 may be configured to generate a speech pattern model for the user based on the extracted speech. In some embodiments, the speech pattern model may include the user's regular speech tempo, tone, volume, etc. In some embodiments, the speech pattern model may include the user's pattern using speech sounds, such as substituting /w/ for /r/ like in "wabbit." In some embodiments, the speech pattern model may include the user's frequent use of certain word, such as "like," "you know," "um," etc. In some embodiments, the speech pattern model may include the user's preferred static phrases, such as "a little of," "a bit of," etc. The speech pattern model may include other features or characteristics of the user's normal speech. In some embodiments, the server may be configured to perform machine learning in generating the speech pattern model.

At step 440, the speech pattern model module 330 may be configured to update the generated speech pattern model based on later received recordings. In some embodiments, the server may be configured to dynamically update and calibrate the speech pattern model when more recordings are received. In some embodiments, the server may be configured to perform machine learning in updating the speech pattern model.

Figure 5:
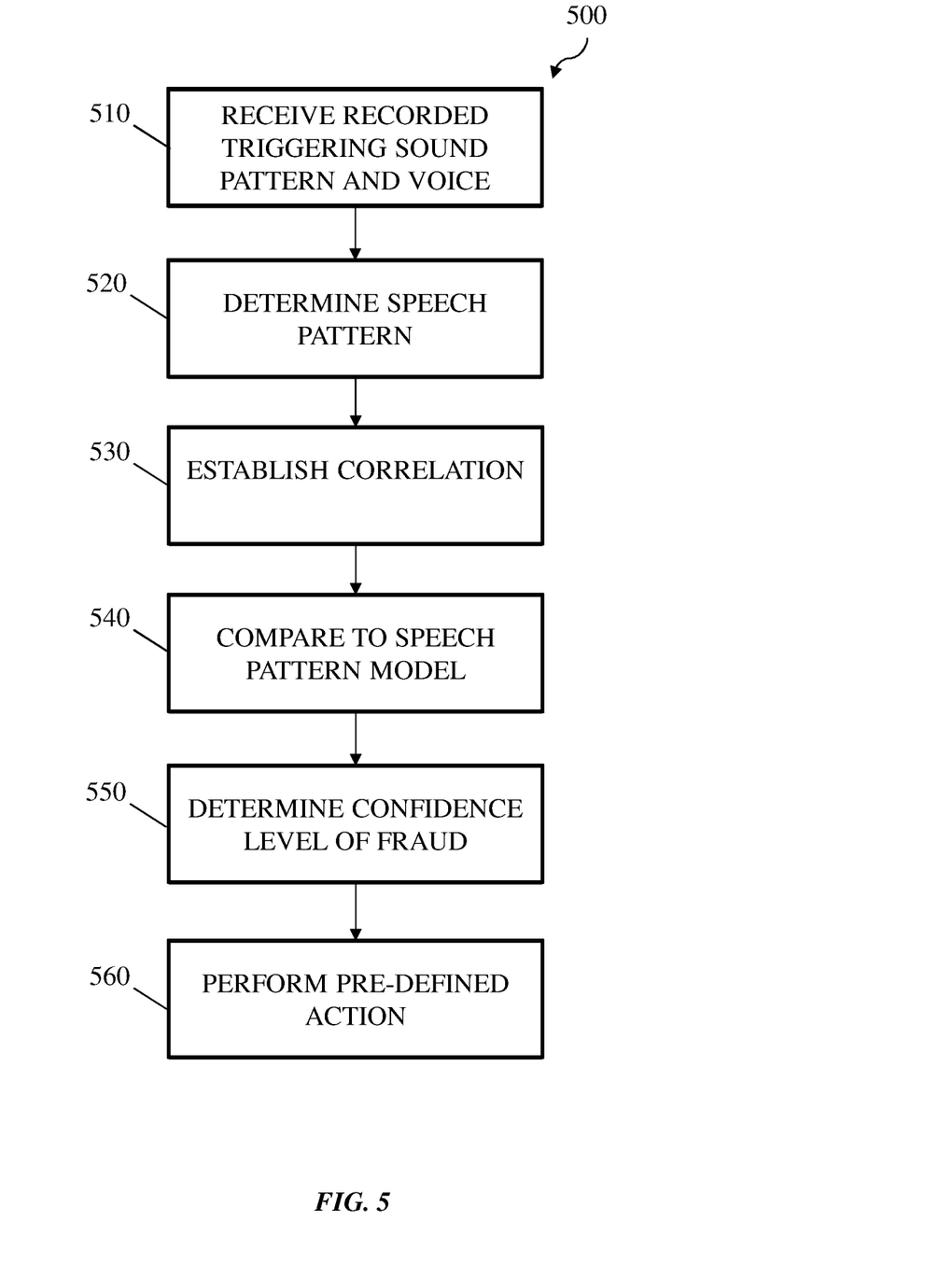
FIG. 5 is a flowchart showing a method of fraud protection with a server, according to some embodiments of the present disclosure.

FIG. 5 is a flowchart showing a fraud protection method 500, according to some embodiments of the present disclosure. At step 510, the recording receiving module 310 may be configured to receive one or more recordings from the listening device. The one or more recordings may include a triggering sound pattern and the user's voice, as described in the method 200 shown in FIG. 2.

At step 520, the speech analysis module 320 may be configured to determine a speech pattern of the user based on the recorded voice of the user. In some embodiments, the speech analysis module 320 may be configured to first remove ambient noise from the recordings. In some embodiments, the speech analysis module 320 may be configured to isolate and extract the user's speech from a multi-party conversation. In some embodiments, the speech analysis module 320 may be configured to determine the user's speech tempo, tone, volume, etc. In some embodiments, the speech analysis module 320 may be configured to determine the user's pattern using speech sounds. In some embodiments, the speech analysis module 320 may be configured to determine the user's frequent use of certain word, such as a filler word. In some embodiments, the speech analysis module 320 may be configured to determine the user's use of static phrases. In some embodiments, the speech analysis module 320 may be configured to determine the presence of repetition in the user's speech.

At 530, the fraud analysis module 340 may be configured to determine if the recorded voice of the user is related to the triggering sound pattern. For example, after hearing a playback of a voicemail, the user may not have any response to the voicemail, but may speak for other reasons. Thus, there may be no correlation between the voicemail and the user's voice. In another embodiment, after a salesperson knocks on the door, the user may engage a conversation with the salesperson. In this example, the user's voice may be determined to be correlated to the door knock sound. In some embodiments, it may take a relatively long time before the user responds to the triggering sound pattern. For example, the user may hear an alarming commercial on day 1 but may not take any action until day 2 (e.g., initiate a conversation, etc.) Therefore, in some embodiments, the fraud analysis module 340 may be configured to analyze the user's voice over time to determine a correlation to the triggering sound pattern.

At step 540, the fraud analysis module 340 may be configured to retrieve a prior stored speech pattern model of the user from the speech pattern model module 330. The prior stored speech pattern model may be determined with the method 400 shown in FIG. 4. The fraud analysis module 340 may be configured to compare the determined speech pattern with the prior stored speech pattern model of the user. The sign that the user speaks differently from his or her usual way of speech may be an indication of a potential fraud. In some embodiments, the frequency of filler words such as "um" may be an indicator of the user's confidence level. For example, if the user is confident in what he or she is talking about, there may be less filler words in the user's speech, and vice versa. In some embodiments, repetition may be an indicator of confidence and comfort. For example, if the user is repeating or stating the same thing in a variety of ways, it may indicate the user does not feel like he or she is being understood. In some embodiments, volume may be an indicator of the user's emotion. For example, louder speech may relate to being upset, whereas quieter talks may relate to being scared. In some embodiments, tempo may be an indicator of a mental state. For example, if the user is speaking very rapidly, it may indicate the user is in a hurry to do something. If the speech is triggered by a scary advertisement, then the user may be in a hurry to address whatever it was that the advertisement was warning about.

In some embodiments, a deviation from the usual speech pattern may also indicate a medical condition. For example, if the user's speech is more slurred than his or her usual speech, it may indicate the presence of a medical condition and require to alert another entity (e.g., a caregiver, a first responder, etc.)

At step 550, the fraud analysis module 340 may be configured to determine a confidence level of fraud based on the correlation between the triggering sound pattern and the user's voice (step 530) and the difference between the speech pattern and the user's speech pattern model (step 540). In some embodiment, if it is determined the user's voice is a direct response to the triggering sound pattern, the likelihood of a potential fraud may be greater than a scenario in which the two are not related. In some embodiment, if it is determined that the speech pattern deviates significantly from the user's speech pattern model, the likelihood of a potential fraud may be greater than a scenario in which the two match well. For example, the triggering sound pattern may be the word of "IRA" or "investment". In response to the triggering sound pattern, the user may speak passionately and the speech pattern is obviously different from the user's normal speech. Therefore, the fraud analysis module 340 may be configured to determine a high confidence level of fraud which may indicate a potential fraud. In some embodiments, an over 50% variation in speech pattern may be enough to trigger an alert which may be sent for manual review.

At step 560, the action module 350 may be configured to perform a pre-defined action if the determined confidence level of fraud is greater than a threshold value. In some embodiments, the pre-defined action may include an operation on an account associated with the user, such as a bank account, an investment account, an individual retirement account (IRA), a credit card account, etc. In some embodiments, the operation may include placing or updating a flag status on the user's account, so that the corresponding financial institution may be placed on high alert for a transfer or payment that coincides with the potential fraud. The financial institution may reject the transaction or require additional confirmation. In some embodiment, the operation may be more proactive, such as freezing the user's account until a further review or verification is conducted. In some embodiments, the account freezing may be temporary and last for a short period of time such as a few hours, which may provide a buffer time. During the buffer time, the user may cool down and recognize the potential scam. In some embodiments, the pre-defined action may include sending an alert to a pre-determined entity, such as a family member, a caregiver, a law enforcement agency, a financial institution, etc.

In some embodiments, different actions may correspond to different threshold values. For example, if a determined confidence level of fraud exceeds a first threshold value of 50%, the action module 350 may be configured to place a flag on the user's account. If the confidence level of fraud is greater than a second threshold value of 70%, the action module 350 may be configured to send an alert to a caregiver associated with the user. If the determined confidence level of fraud is greater than a third threshold value of 90%, the action module 350 may be configured to freeze the user's account.

Figure 6A:
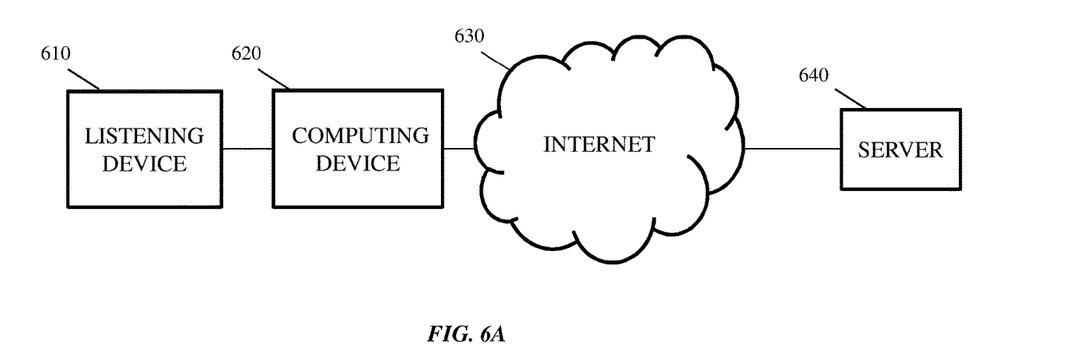
FIGS. 6A-6B are system diagrams showing connections between a listening device and a server, according to some embodiments of the present disclosure.
Figure 6B:
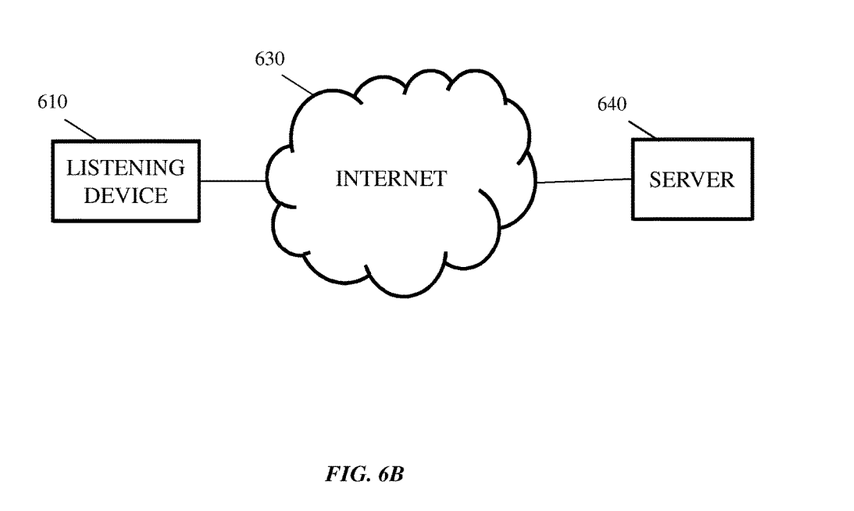

FIGS. 6A-6B are system diagrams of the fraud protection system, according to some embodiments of the present disclosure. As shown in FIG. 6A, in some embodiments, listening device 610 may be configured to connect to a computing device 620 such as a computer, whereas computing device 620 is connected to the Internet 630. Server 640 may be configured to connect to the Internet and communicate with the listening device 610 through computing device 620. For example, listening device 610 may be configured to connect to a home computer 620 through an interface (e.g., USB, Bluetooth®, etc.), and the home computer 620 may be configured to connect to the Internet 630 via a cable modem.

FIG. 6B shows another exemplary configuration. In some embodiments, listening device 610 may be configured to directly connect to the Internet 630 and communicate with server 640. For example, listening device 610 may be configured to directly connect to a wireless access point or a Wi-Fi router and access to the Internet 630.

Figure 7:
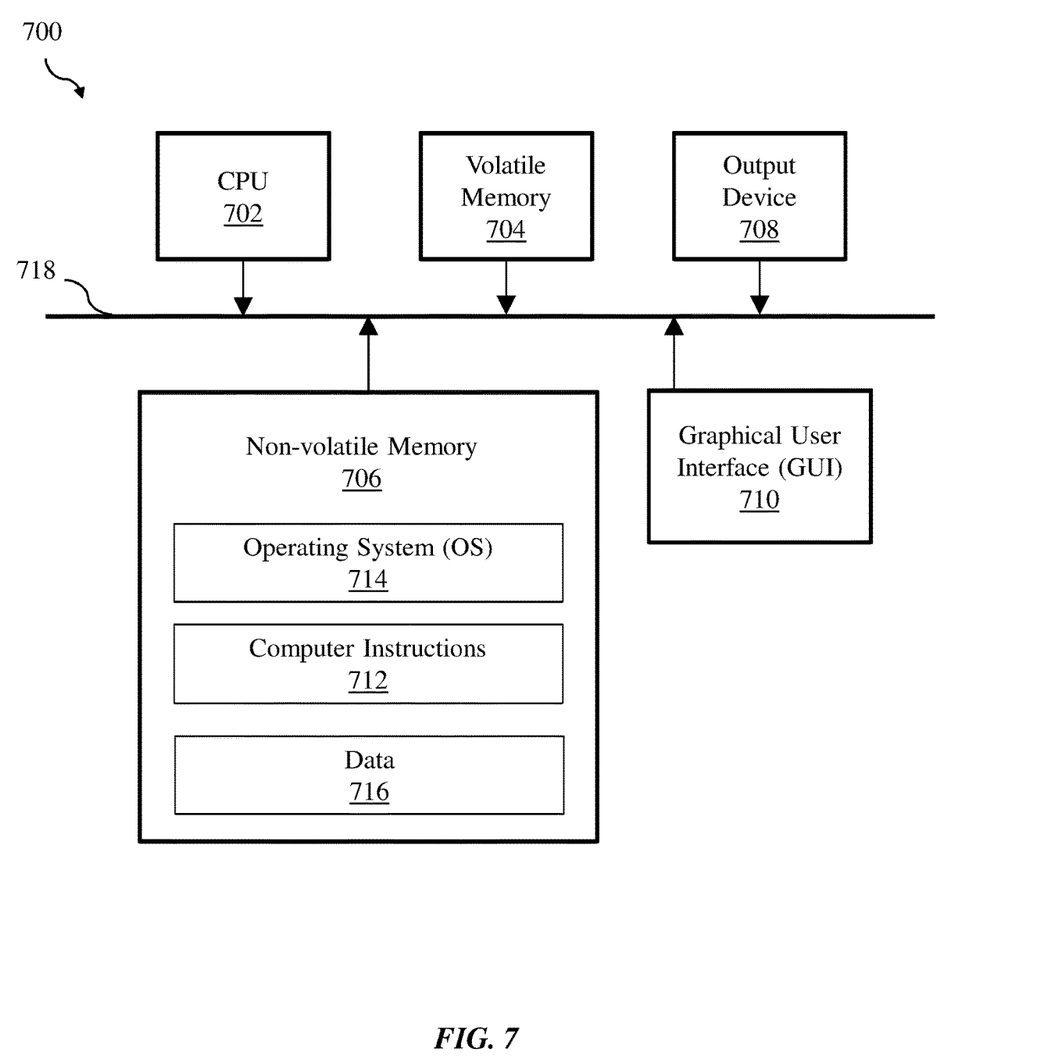
FIG. 7 is a block diagram showing a computing device and its components, according to some embodiments of the present disclosure.

FIG. 7 shows an illustrative computer 700 that may perform at least part of the processing described herein, according to an embodiment of the disclosure. In some embodiments, the server 640 or the computing device 620 of FIGS. 6A and 6B may include the computer 700, or otherwise form a portion of the computer 700. The computer 700 may include a processor 702, a volatile memory 704, a non-volatile memory 706 (e.g., hard disk), an output device 708 and a graphical user interface (GUI) 710 (e.g., a mouse, a keyboard, a display, for example), each of which is coupled together by a bus 718. The non-volatile memory 706 may be configured to store computer instructions 712, an operating system 714, and data 716. In one example, the computer instructions 712 are executed by the processor 702 out of volatile memory 704. In some embodiments, the computer 700 corresponds to a virtual machine. In other embodiments, the computer 700 corresponds to a physical computer.

Referring again to FIG. 7, processing may be implemented in hardware, software, or a combination of the two. In various embodiments, processing is provided by computer programs executing on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The system may perform processing, at least in part, via a computer program product, (e.g., in a machine-readable storage device), for execution by, or to control the operation of, data processing apparatus (e.g., a programmable processor, a computer, or multiple computers). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer. Processing may also be implemented as a machine-readable storage medium, configured with a computer program, where upon execution, instructions in the computer program cause the computer to operate. The program logic may be run on a physical or virtual processor. The program logic may be run across one or more physical or virtual processors.

Processing may be performed by one or more programmable processors executing one or more computer programs to perform the functions of the system. All or part of the system may be implemented as special purpose logic circuitry (e.g., an FPGA (field programmable gate array) and/or an ASIC (application-specific integrated circuit)).

Additionally, the software included as part of the concepts, structures, and techniques sought to be protected herein may be embodied in a computer program product that includes a computer-readable storage medium. For example, such a computer-readable storage medium may include a computer-readable memory device, such as a hard drive device, a CD-ROM, a DVD-ROM, or a computer diskette, having computer-readable program code segments stored thereon. In contrast, a computer-readable transmission medium may include a communications link, either optical, wired, or wireless, having program code segments carried thereon as digital or analog signals. A non-transitory machine-readable medium may include but is not limited to a hard drive, compact disc, flash memory, non-volatile memory, volatile memory, magnetic diskette and so forth but does not include a transitory signal per se.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a plurality of system elements, device components or method steps, those elements, components or steps may be replaced with a single element, component or step. Likewise, a single element, component or step may be replaced with a plurality of elements, components or steps that serve the same purpose. Moreover, while exemplary embodiments have been shown and described with references to particular embodiments thereof, those of ordinary skill in the art will understand that various substitutions and alterations in form and detail may be made therein without departing from the scope of the invention. Further still, other embodiments, functions and advantages are also within the scope of the invention.

What is claimed is:

1. A computer-implemented method of fraud protection for a computer-accessible account, comprising:
monitoring, by a listening device, ambient sound;
detecting, by the listening device, one or more triggering sound patterns from the ambient sound, the one or more triggering sound patterns including sound indicative of an initiation of an interaction between an initiator and a recipient;
in response to detecting the one or more triggering sound patterns, transmitting, by the listening device, to a server in communication with the listening device, the one or more triggering sound patterns and a recording of the recipient's voice obtained by the listening device after the detecting,
and wherein the server is configured to:
determine a correlation between the one or more triggering sound patterns and at least one portion of speech from the recorded recipient's voice;
detect a difference in a speech pattern model of the recipient from the recorded recipient's voice, including determining that a speech pattern of the recipient is different from the speech pattern model of the recipient, the speech pattern model being based on one or more speech samples of the recipient;
calculate a confidence level of fraud being attempted against the recipient based on the determined correlation and the detected difference; and
generate and transmit an alert in response to determining that the confidence level of fraud is greater than a threshold value.

2. The method of claim 1, wherein the one or more triggering sound patterns comprise at least one of "IRS," "owe," "money," "debt," "wire," "IRA," "investment," "may be at risk," "retirement," "back taxes," "act now," "before it's too late," "time is running out," "failure to act," "once in a lifetime," "you've won," "last chance," "arrest," or "pay."

3. The method of claim 1, wherein the one or more triggering sound patterns comprises at least one of a doorbell sound, a door knock sound, a phone ring, a voicemail, or a TV sound clip.

4. The method of claim 1, wherein a duration of the recording is between 0.1 and 300 seconds.

5. The method of claim 1, further comprising:
receiving, by the listening device, the alert from the server; and
outputting a notification in response to receiving the alert.

6. The method of claim 1, further comprising:
detecting one or more triggering words in the recipient's voice; and
adjusting a duration of the recording in response to detecting the one or more triggering words.

7. A computer-implemented method of fraud protection for a computer-accessible account, comprising:
receiving, by a server, one or more speech samples associated with a person;
generating a speech pattern model of the person based on extracting a person's speech from the one or more speech samples;
storing the speech pattern model of the person;
receiving one or more triggering sound patterns and a recording of the person's voice obtained by a listening device, the one or more triggering sound patterns including sound indicative of an initiation of an interaction between an initiator and a recipient;
determining, a correlation between the one or more triggering sound patterns and at least one portion of speech from the person's voice, thereby identifying the person as the recipient;
detecting a difference in the speech pattern model from the recorded recipient's voice, including determining that a speech pattern of the recipient is different from the speech pattern model of the recipient;
determining a confidence level of fraud being attempted against the recipient from the determined correlation between the one or more triggering sound patterns and the recording of the recipient's voice and the detected difference; and
generating and transmitting an alert in response to determining that the confidence level of fraud is greater than a threshold value.

8. The method of claim 7, wherein the one or more triggering sound patterns comprise at least one of "IRS," "owe," "money," "debt," "wire," "IRA," "investment," "may be at risk," "retirement," "back taxes," "act now," "before it's too late," "time is running out," "failure to act," "once in a lifetime," "you've won," "last chance," "arrest," or "pay."

9. The method of claim 7, wherein the one or more triggering sound patterns comprises at least one of a doorbell sound, a door knock sound, a phone ring, a voicemail, or a TV sound clip.

10. The method of claim 7, wherein transmitting the alert comprises sending an alert to a pre-determined entity associated with the recipient.

11. The method of claim 10, wherein the pre-determined entity comprises at least one of a financial institution, a law enforcement agency, a family member of the recipient, or a caregiver associated with the recipient.

12. The method of claim 7, further comprising:
updating a flag status of the computer-accessible account associated with the recipient in response to determining that the confidence level of fraud exceeds a second threshold value; and
outputting the flag status of the account in a user interface.

13. The method of claim 12, wherein the computer-accessible account associated with the recipient comprises at least one of a bank account, a checking account, a saving account, a credit card account, an investment account, a loan account, or an individual retirement account.

14. A system of fraud protection for a computer-accessible account, comprising:
one or more microphones configured to monitor ambient sound and detect one or more triggering sound patterns from the ambient sound, the one or more triggering sound patterns including sound indicative of an initiation of an interaction between an initiator and a recipient; and
a processor circuit coupled to the one or more microphones and configured to execute instructions causing the processor to:
in response to the one or more microphones detecting the one or more triggering sound patterns, transmit, to a server in communication with the listening device, the one or more triggering sound patterns and a recording of the recipient's voice obtained by the one or more microphones after the detecting;
and wherein the server is configured to:
determine a correlation between the one or more triggering sound patterns and the recording of the recipient's voice;
determine a speech pattern of the person from the recorded recipient's voice;
determine a correlation between the one or more triggering sound patterns and at least one portion of speech from the recorded recipient's voice;
detect a difference in a speech pattern model of the recipient from the recorded recipient's voice, including determining that the speech pattern of the recipient is different from the speech pattern model of the recipient, the speech pattern model being based on one or more speech samples of the recipient;
calculate a confidence level of fraud being attempted against the recipient based on the determined correlation and the detected difference; and
generate and transmit an alert in response to determining that the confidence level of fraud is greater than a threshold value.

15. The system of claim 14, wherein the one or more triggering sound patterns comprise at least one of "IRS," "owe," "money," "debt," "wire," "IRA," "investment," "may be at risk," "retirement," "back taxes," "act now," "before it's too late," "time is running out," "failure to act," "once in a lifetime," "you've won," "last chance," "arrest," or "pay."

16. The system of claim 14, wherein a duration of the recording is between 0.1 and 300 seconds.

17. The system of claim 14, wherein transmitting the alert comprises sending an alert to a pre-determined entity associated with the recipient.

18. The system of claim 17, wherein the pre-determined entity comprises at least one of a financial institution, a law enforcement agency, a family member of the recipient, or a caregiver associated with the recipient.

19. The system of claim 14, wherein the processor circuit is further configured to:
receive the alert from the server; and
output a notification in response to receiving the alert.

20. The system of claim 19, comprising:
a speaker coupled to the processor circuit, wherein the processor circuit is configured to output the notification by playing, with the speaker, an audio file.

* * * * *